Feb. 17, 1959     H. F. MAY     2,873,633

POWER ELEMENTS FOR THERMOSTATS

Filed Nov. 7, 1952

INVENTOR
Howard F. May
BY
Willits, Helwig & Baillio
ATTORNEYS

United States Patent Office 2,873,633
Patented Feb. 17, 1959

2,873,633

POWER ELEMENTS FOR THERMOSTATS

Howard F. May, Medina, N. Y., assignor to General Motors Corporation, Detroit, Mich., a corporation of Delaware Application November 7, 1952, Serial No. 319,289

1 Claim. (Cl. 73—358)

This invention relates to expansible power elements and more particularly to thermally controlled expansible power elements of the type employed in thermostats for actuating valves and the like.

Thermostatic power generating substances in the form of gases, liquids and various types of solids have been used in various types of thermostats. Considerable difficulty, however, has been encountered in devising an expansible thermostatic element which will expand only during a relatively narrow predetermined temperature range with sufficient power to overcome the pressure to which an element operated thereby might be subjected. An example of the use of such thermostatic power elements is in the control of the valves in engine liquid cooling systems. In such systems it is desirable that the control valves remain closed until the engine warms up and then open to permit the coolant to circulate through the associated radiator. When the temperature of the coolant falls below the proper predetermined value, the valves should again close. In this manner, as is well known in the art, the liquid coolant may be maintained at the appropriate temperature. In modern internal combustion engines pressure caps have been employed which increase the pressure of the liquid coolant in the system, in some cases, considerably above atmospheric pressure and the control valves must be operated to open position against this pressure. Many of the expansible substances used in thermostats which had proven to be satisfactory in systems operating at atmospheric pressure are not suitable for the pressure systems primarily because they lack sufficient power to overcome the pressure therein to open the valves when the desired start to open temperature is reached. As a result the valves will not open until the temperature rises considerably above the desired value. This obviously causes rapid boiling off of the liquid coolant which might result in serious damage to the engine and associated parts.

One object of the present invention is to provide an expansible thermostatic power element which will expand to its fullest extent throughout only a relatively narrow predetermined temperature range.

Another object is to provide an expansible thermostatic element of the stated character having sufficient power during the expansion thereof to overcome substantial external pressures.

A further object is to provide a novel expansible thermostatic power generating element consisting of a crystalline wax, a suitable plasticizer which enters into solution with the wax, and a powdered metal for conducting heat throughout the mass of the element.

A still further object is to provide a power generating element of the stated character in which the powdered metal may settle toward the bottom of the element when in the molten state but which will become dispersed throughout the pellet upon the partial solidification of the element and which remains in the latter state when complete solidification thereof takes place.

Other and further objects will become apparent as the description of the invention progresses.

Figure 1:
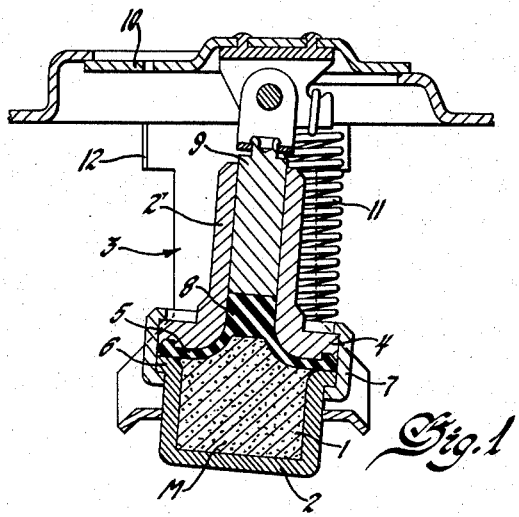
Fig. 1 is a sectional elevational view, partly diagrammatic, of a thermostat employing the power generating element comprising the present invention and showing the power element in its normal solid state at which time the finely divided metal particles are dispersed throughout the element.

Referring to the drawing, the numeral 1 indicates generally an expansible thermostatic power generating element which is mounted in the container 2 of a thermostatically controlled device 3. A cylinder 2' is disposed above the container 2 and has an annular flange 4 provided near the lower end thereof. A diagphram 5 is disposed between the flange 4 and the flange 6 provided at the upper end of container 2. A securing ring 7 having the upper and lower ends thereof rolled over or crimped compresses the diaphragm 5 between the flanges 4 and 6 and provides an effective seal to prevent the escape of any of the thermostatic material under all conditions of operation. Diaphragm 5 has a centrally disposed plunger 8 integral therewith which operates in cylinder 2' during the expansion and contraction of power element 1. Plunger 8 actuates a piston 9 mounted in cylinder 2' which piston in turn is operatively connected by a link connection with a valve 10, switch or any other device to be operated by the thermostat. A pair of coil springs 11 are secured to and extend between member 10 and a fixed supporting casing 12 and operate to return the parts to normal position upon contraction of thermostatic element 1.

The thermostatic element 1 may include any suitable expansible crystalline substances such as waxes or hydrocarbons as the expanding ingredient. Although various forms of crystalline substances may be employed, it has been found that waxes which are classified as microcrystalline and obtained by distillation of certain types of oils are especially desirable. To obtain the most efficient results the waxes so produced are further refined by molecular distillation and solvent extraction. In the distillation process a fraction of the distillate is selected having the necessary properties to expand only within the desired temperature range. Upon experimentation it has been found that waxes obtained in this fashion expand during different predetermined temperature ranges. If the thermostat is to be used in liquid cooling systems for engines, it is desirable that the wax expand only within the range of a few degrees in the vicinity, for example of 160° F. or in the vicinity of 180° F. depending upon the requirements of the engine. Accordingly, the wax selected must be of such a nature as to expand only at the desired predetermined temperatures. Accordingly, supposing that it is desired that the start-to-open temperature shall be 160° F., a wax of this type will be employed and experiments have shown that a pellet including such wax will remain substantially in a solid state until a temperature slightly in excess of 160° F. has been attained. When this higher temperature is reached the pellet rapidly changes from a solid to a liquid state causing a substantial expansion to take place. The expanding pellet now operates plunger 8 and piston 9 which in turn actuate the valve or other element 10 toward open position. The expansion of the pellet will continue only during a temperature rise of a few degrees above 160° F. when substantially complete expansion thereof will have taken place. In case the temperature should then rise above this value no substantial further expansion of the pellet takes place. It therefore is seen that the change in the state of the pellet from a solid to a liquid takes place within a very narrow predetermined temperature range and therefore such pellets are highly reliable and assure operation of coolant control valves, at the required temperature. Upon opening of the control valve at the predetermined temperature, the coolant may then circulate through the associated radiator and thus is maintained at the desired temperature. When the temperature falls below the predetermined start-to-open temperature, the pellet solidifies and contracts whereupon the springs 11 then actuate the valve to closed position as shown in Fig. 1.

When the temperature again rises to the start-to-open temperature the valve will again begin to open and the cycle of operation just described is repeated.

Crystalline waxes are hard and brittle and therefore it is desirable to add a plasticizer such as tricresylphosphate or a mineral oil thereto. These substances enter into solution with the wax and render the resultant composition more plastic and pliable. In order to cause rapid transfer of heat through the mass of the element 1, it has been found desirable to employ powdered metal such as powdered copper, or powdered aluminum. Preferably the finely divided particles are of a flaky nature so as to have a relatively large surface as compared with the thickness thereof. A quantity of the powdered metal is added to the plastic mass when the latter is in the molten state. The percentage ranges of the different ingredients that might be employed in thermostatic devices of the general type described herein employing tricresylphosphate may vary widely and might include:

| | Percent by weight |
|---|---|
| Crystalline wax | 12.5 to 66 |
| Tricresylphosphate | 13.5 to 1 |
| Metal powder | 74 to 33 |

This constitutes a relatively wide range and it will be noted that when more metallic powder is used a greater amount of cresylphosphate is employed to render the mass sufficiently plastic to permit the additional metal to be added. While different ranges of ingredients might be employed it has been found that for use in engine coolant systems a pellet consisting of:

| | Percent by weight |
|---|---|
| Crystalline wax | 63.3 |
| Tricresylphosphate | 3.3 |
| Aluminum powder | 33.4 | is particularly suitable. When mineral oil, di butyl phtholate or di butyl sebacate are used as plasticizers the percentage ranges of the ingredients might vary somewhat from those listed in association with tricresylphosphate.

Figure 3:
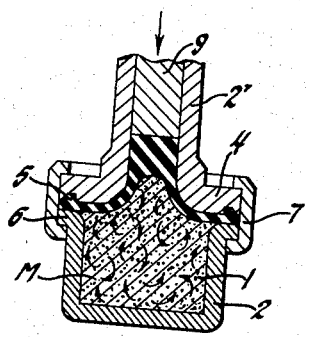
Fig. 3 is a view similar to Figs. 1 and 2, but showing the manner in which the metallic particles are dispersed throughout the element when partial solidification of the element takes place.

Referring to the drawings, it will be observed that when the pellet 1 is in the contracted state the parts assume the position shown in Fig. 1 wherein the metal particles indicated at M are evenly distributed throughout the mass thereof. When the temperature has increased sufficiently to cause the element to melt to a liquid, the metal particles M, it will be observed, settle toward the bottom and along the side wall of the container 2. This occurs since the solution of wax and tricresylphosphate becomes a relatively mobile liquid when heated and even though particles of flaky aluminum are employed, the weight thereof is sufficient to cause the latter to gravitate toward the bottom of the container. From this view it is seen that particles in the outer layers of the pellet remain substantially undisturbed at all times insofar as their position is concerned. This is due to a "skin effect" which is recognized as a fluid flow phenomenon. Now upon lowering of the temperature below the predetermined start-to-open temperature cooling of the pellet naturally first takes effect around the exposed areas of the container 2 which causes contraction of the said pellet to take place. The springs 11 now urge the plunger downwardly. By this action turbulence is set up in the still molten inner body of the element which is indicated by the arrows in Fig. 3, thereby causing dispersion of the settled particles and eventual distribution thereof throughout the entire mass. The settled particles have been reduced somewhat in temperature by their proximity to the container walls and by conduction and their dispersion throughout the mass therefore results in the transfer of a lower temperature throughout the entire pellet which causes rapid cooling to take place. In the thermostat illustrated, the principle of plastic flow is illustrated. The cylinder acts as the die and the expanding pellet causes the extrusion of the remaining solidified mass. As equilibrium is reached the wax becomes completely molten and the metal, as previously described, then settles toward the bottom of the container. At the temperature of closing of the valve the outer layer of the molten material becomes solid. Because of the lag in heat transfer the material disposed in the restricted or central zone remains molten until last, it flowing into the solidifying pellet by the pressure of the springs as contraction of the pellet takes place. This causes a turbulence or a stirring action, shown by the arrows, which redistributes the particles that had settled out during the time the pellet was completely molten. Complete solidification of the element traps the particles in their distributed state.

Figure 2:
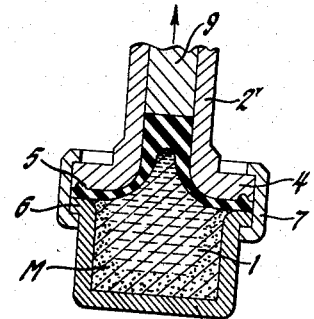
Fig. 2 is a view similar to Fig. 1 showing the power element in its molten and expanded condition and wherein the metallic particles have settled toward the bottom and sides of the associated container.

By employing ingredients such as those referred to herein, no binding action takes place to hold the metal particles in suspension at all times. Instead, the metal particles settle out, as shown in Fig. 2, when the element 1 becomes molten and when the closing temperature of the valve is reached this lower temperature, as previously pointed out, is rapidly communicated to the metallic particles, and when the stirring or mixing action takes place as a result of the downward movement of plunger 8, these particles are distributed throughout the mass and carry the lower temperature with which they are charged throughout this mass thereby causing rapid cooling to take place. By this action rapid cooling and solidification of the pellet may be effected with the use of a relatively small quantity of metal particles.

It has been found that a substantial expansion takes place when the pellet changes from the solid to the liquid state, and since it is confined within a rigid container a relatively great force is imposed on the plunger 8 and piston 9 and, accordingly, opening of the valve is assured even in systems wherein the valves are subjected to relatively high pressures. Therefore since the pellet always liquifies at the desired predetermined temperature, opening of the associated valve at that temperature is assured.

Inasmuch as other embodiments may be made without departing from the spirit of the invention it is to be understood that it is not intended to limit the invention to the particular disclosures herein but only by the scope of the claim which follows.

What is claimed is:

A power element for thermostats including a cylinder, a plunger reciprocable in said cylinder, a flowable material confined within said cylinder, a restricted zone of said material acting upon said plunger and urging the latter to move in one direction, said material being expansible and contractible with the application and removal of heat and comprising crystalline wax, metallic particles and a plasticizer for said wax, said plasticizer being in an amount sufficient to reduce the viscosity of said wax within a predetermined temperature range in which said power element is operable, the amount of plasticizer being such as sufficiently to reduce the viscosity to a degree which will permit gravitational precipitation of the metal particles upon said material entering said temperature range and at the same time the material being sufficiently viscous upon cooling to maintain the redispersed condition of the particles caused by the turbulence set up by the action of the plunger.

References Cited in the file of this patent

UNITED STATES PATENTS

| | | |
|---|---|---|
| 2,221,347 | Giesler | Nov. 12, 1940 |
| 2,259,846 | Vernet et al. | Oct. 21, 1941 |
| 2,534,497 | Albright | Dec. 19, 1950 |
| 2,593,238 | Albright | Apr. 15, 1952 |